UNITED STATES PATENT OFFICE.

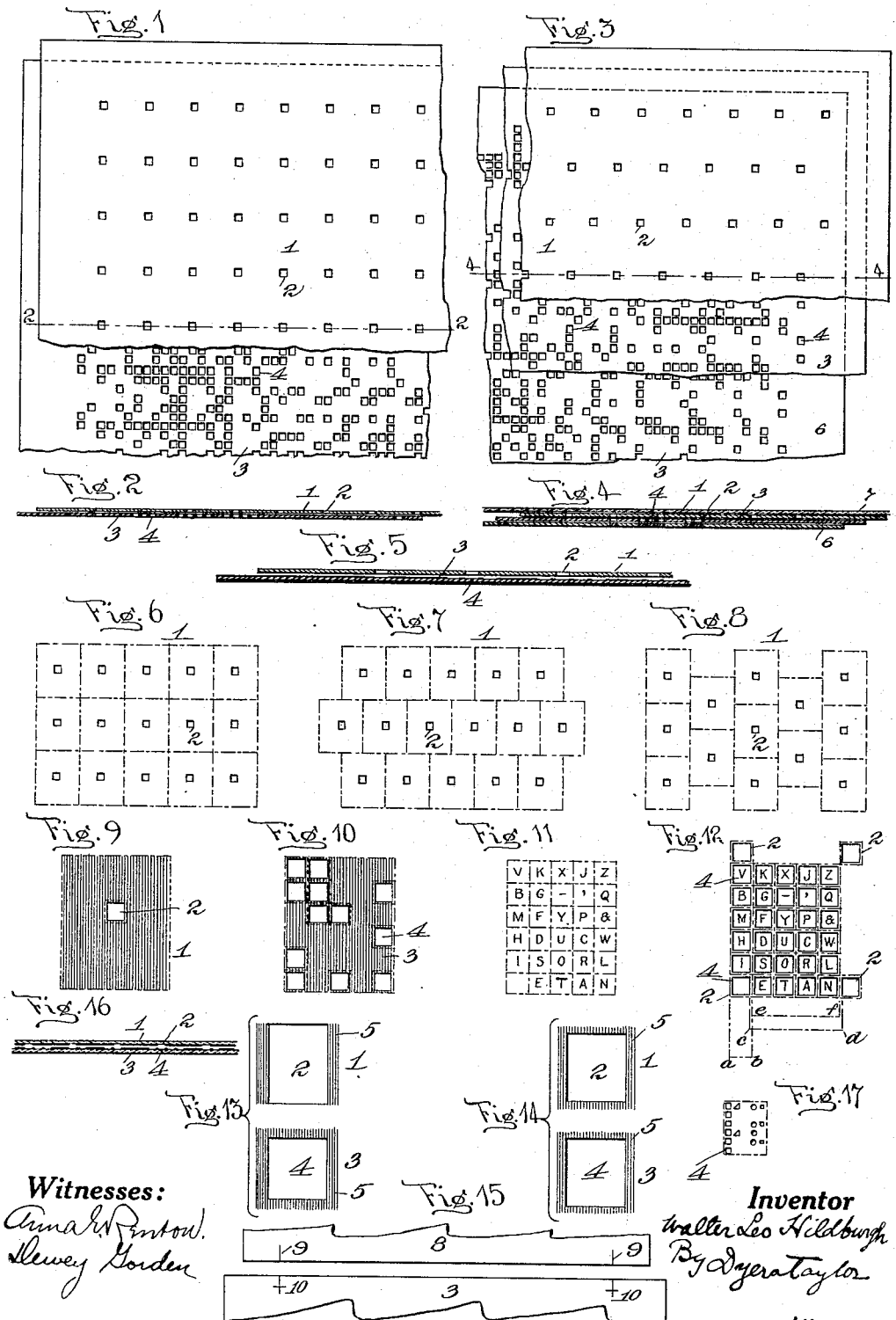

WALTER LEO HILDBURGH, OF WESTMINSTER, LONDON, ENGLAND.

ADVERTISING MACHINERY.

1,172,360.  Specification of Letters Patent.  Patented Feb. 22, 1916.

Application filed September 25, 1909. Serial No. 519,597.

*To all whom it may concern:*

Be it known that I, WALTER LEO HILDBURGH, a citizen of the United States of America, and residing at St. Ermins Hotel, Westminster, London, in the county of Middlesex, England, have invented a certain new and useful Improvement in Advertising Machinery, of which the following is a specification.

My invention relates to improvements in devices in which a plurality of plates is employed. One at least of the plates is transparent as to its base, rendered opaque in part, and the plates are capable of having a step-by-step movement relatively to each other to show letters, figures or other designs.

In my British Patent No. 10,811 of 1906 I show two plates, one of which is transparent and partially covered with two sets of parallel, opaque lines perpendicular to each other. The other plate is covered in part with lines so arranged as to form legible designs when viewed through the transparent areas of the first plate.

The lines on the first mentioned plate are spaced apart a distance equal to the width of the lines and the transparent areas are rectangles of a size equal to the width of the lines. On the second plate the lines are of a size to block certain transparent areas in the first plate when brought into position to do so. With the arrangement of lines and spaces described above it is obvious that but four separate designs may be made by moving the plates relatively to each other.

The general objects of my present invention are to increase the number of independent designs which may be shown, with one pair of plates, from four to any number within the limits of the particular combination of parts used.

These and further objects will more fully appear in the following specification and accompanying drawings, considered together or separately.

In carrying my invention into effect I prepare a transparent plate by covering most of its surface with an opaque material and thus producing a plate having regularly disposed transparent areas of small size, as compared to the opaque spaces between them and arranged in regular order on the plate in parallel lines. Upon another plate is placed a series of preferably square blocks, or their equivalents, of color arranged so that when the plates are placed parallel with, and comparatively near to each other, different designs may be exhibited masking and unmasking the transparent areas in the first plate as the plates are given a step-by-step movement relatively to each other. I arrange the plates so that such movement will be intermittent and the extent of each movement vertically or horizontally will be equal to the distance in that direction between the centers of the transparent areas.

In the drawings in which similar reference characters designate corresponding parts in all of the figures, Figure 1 is a front elevation of portions of a pair of plates embodying my invention; Fig. 2 is a section on the line 2—2 of Fig. 1; Fig. 3 is a similar view of a modification showing the use of three plates and a different arrangement of openings in one plate; Fig. 4 is a section on the line 4—4 of Fig. 3, showing the topmost plate provided with a protecting cover of transparent material; Fig. 5 is a sectional view of a modification; Fig. 6 is a diagram showing the arrangement of the units of a plate; Figs. 7 and 8 are diagrams showing modifications of the arrangements of the units; Fig. 9 is a view of a unit area of a stationary plate; Fig. 10 is a similar view of a unit area of a movable plate; Fig. 11 is a diagram showing the relative positions of the areas of visual effect in a movable plate for presenting thirty independent designs; Fig. 12 is a diagram illustrating the extent of the relative movements of the plates; Figs. 13 and 14 are enlarged diagrams showing modifications of the visual areas; Fig. 15 is a view of a plate and a holder for the same showing guide marks to facilitate their setting accurately with respect to each other; Fig. 16 is a sectional detail view showing plates of transparent material with the visual areas bounded by opaque material; and Fig. 17 is a detail front view of a unit area of a movable plate with modified visual areas.

In the drawings, 1 represents a plate which I will designate the stationary plate. This plate is provided with visual areas 2 regularly disposed in parallel lines, the areas being equidistant and occupying a trifle less than 1/30th of the area of the plate. That is to say more than 29/30ths of the plate is opaque and less than 1/30th transparent, the transparent areas being so disposed that the plate is divided into a number of rectangular unit areas each of which contains an opening 2 occupying less than 1/30th of the area of the unit. This arrangement is graphically shown in Figs. 6, 7 and 8. The visual areas may be openings in the plate, or the plate may be of transparent material with its surface, except at the areas, covered with an opaque substance.

I will describe, using Fig. 11 for illustration, how each unit may be formed. On a rectangle such as shown in the figure, draw horizontal lines equal in thickness to 1/5th of the width of the rectangle through the first, second, fourth, fifth and sixth divisions, counting from the top. This will leave a vacant space equal in width to the thickness of each line across the rectangle at the squares marked M F Y P &. Now draw vertical lines of the same thickness as the others, through the first, second, fourth and fifth vertical divisions. This will leave a vacant space corresponding to the square marked Y in the figure. A thin line may now be drawn around the edges of the space to produce a unit area such as is shown in Fig. 9. Such a plate if held toward a uniformly illuminated area will present, when the number of open spaces is large, a uniform appearance. According to the size of the openings, the proportion of the total area which they occupy, the intensity of the illumination, and the distance from the observer, the effect produced varies from that of a dark field studded with patches of light, through that of a dark field studded with stars, and that of a dark field cut by a net work of light, formed by the intersecting points of the stars, to that of an evenly illuminated field.

I prefer to use the form of plate shown in Figs. 1 and 6 but where the designs contain many inclined lines or where the openings are comparatively large, I may employ the arrangements shown in Figs. 3, 7 and 8 to improve the appearance of the designs.

If the open spaces within a certain area of the stationary plate be closed, that area will appear dark as compared with the partially illuminated remainder of the field. It is evident that the spaces thus closed may be caused to produce a dark area of predetermined form, such as that of the field of a letter or other character. It is also evident that the closing of the open space in each rectangular unit area of the stationary plate may be accomplished by the interposition of an opaque block occupying only 1/30th of a unit area, and that each of the remaining twenty-nine sections of the thirty composing a unit area may or may not be covered by an opaque block whose action is entirely independent of that of the blocks occupying the remaining sections. The openings of the stationary plate may be so set with respect to one of a series of blocks on another plate for example as to produce a certain design, and with respect to another series of blocks so as to produce a design completely independent of the first design, and with respect to a third series of blocks so as to produce a third independent design, until the full number of possible combinations of the units of the two plates, in this case thirty, have been produced.

In connection with the plate 1, I employ a second plate 3, designated herein as the movable plate, provided with areas of visual effect 4. These areas may be transparent as shown in Fig. 2 or, if the plate is to be illuminated from the side from which it is observed, the areas may be reflecting surfaces. The areas may be colored in any manner so that a colored design may appear.

The areas in the movable plate may be of the same size as those of the stationary plate and are so arranged that by the location of the areas of the movable plate in relation to those of the stationary plate an image will be produced. In the embodiment of the invention illustrated I show the movable plate as capable of having thirty areas of visual effect in each unit area. These areas correspond to the twenty-six letters of the alphabet, a hyphen, an apostrophe ('), the character &, and one area vacant.

In preparing a movable plate to exhibit the characters V, G, Y, C, L and clarity, for example, the areas marked by those characters in Fig. 12 are provided one in each of these units of the plate as will, when combined, produce the outline of the particular character. The balance of each unit will remain or be rendered opaque excepting that an area in the lower left-hand corner of all of the units will be transparent. When the two plates are placed face to face with the sections marked "V" opposite the areas in the stationary plate, the outline of V will appear. Move the plate 3 one step to the left and as the space represented by K is opaque the character will be erased. By moving the plate one step upward G will appear. On now shifting the plate one step to the left and one upward, or the equivalent in a diagonal direction, Y will show. Another step up and one to the left will exhibit C. Two similar steps will produce L. Moving the plate up one step and to the right four steps all of the areas in the plate will be illuminated. If desired the section last described may be opaque in which case when the plate 3 is moved to bring those sections opposite the openings 2, the whole of plate 1 will be in darkness.

The diagram Fig. 12 shows a unit of a movable plate capable of exhibiting all of the designs within its limits together with the visual areas 2 of four of the units of the stationary plate. The parts are in position to show clarity, if the lower left hand section of the movable plate be transparent, or vacancy if the section be opaque. The distance $a, b$ shows the extent of each step of the step-by-step movement. The distance $c, d$ indicates the maximum extent of movement to produce all the images in that direction. The distance between contiguous sides of adjacent areas of the stationary plate is indicated at $e, f$. Therefore, the maximum extent of movement of the plate in either direction to produce all the images is equal to the distance between contiguous sides of adjacent areas in that direction of the stationary plate minus the difference in size between a step in the step-by-step movement and the corresponding dimension of the opening.

By increasing the distance between the openings relatively to the size of the openings the number of independent designs which may be produced will be increased. Thus by drawing the equivalent of eleven lines vertically and eleven lines horizontally the area of the open spaces in the stationary plate is reduced to 1/144 of the total area, and 144 independent series of blocks may be put upon the movable plate. When designs such as letters are produced by the illumination of so small a part of the area which they would normally occupy they are, although sometimes feeble in intensity as compared with their fields, perfectly distinct and legible, so that in the proper circumstances even considerably smaller proportions of the normal areas may be employed for the production of the designs.

When the proportion of the plate 1 occupied by the areas 2 is large the movable plate 3 may be opaque and the designs may be produced by light reflected from the plate 3 through the areas in plate 1 as shown in Fig. 5.

It is evident that since the effects of the plates are produced by their movement with respect one to the other, either plate may be fixed, the other plate then having a vertical and a horizontal movement, or one plate may have a vertical and the other a horizontal movement, or both plates may have vertical and horizontal movements.

By making the areas in some portions of the designs of different size than those in others, an effect of partial shading may be produced.

The visual areas are made smaller than a step in the step-by-step movement so as to prevent leakage of light, which will produce an effect out of all proportion to its amount, and for the reason that with areas of the same size as a step in the movement a very small displacement of the plates with respect to each other may produce a mutilation of the design. The difference in size between the opening and a step in the step-by-step movement will constitute a border. The dimensions of this border will vary in accordance with the dimensions of the divisions, the clearance between the plates, and the minimum angles, measured in horizontal and vertical planes, at which the designs are to be viewed. If, for example, the minimum angles, measured from the planes of the plates, at which the designs are to be viewed are 30° at each side and 30° from below, the divisions be each 3/16 inch square, and the clearance be 1/32 inch, I make the border within each open division of the stationary plate about 1/32 inch on each side, and the border within each open division of the movable plate about 3/128 inch on each side and about 7/256 inch at the top and bottom. In Fig. 13 I show, on a magnified scale, a pair of divisions thus bordered, the upper diagram representing a division of the stationary plate and the lower a division of the movable plate. The diagram (Fig. 13) represents the pair of divisions whose dimensions have been given above, and the diagram (Fig. 14) a pair of divisions for use under different conditions. In each of these diagrams the shaded portions represent the borders 5. The network of borders, occurring where a number of open spaces are immediately adjacent to one another, is introduced partly in order to secure uniformity in the illumination of the designs and partly for reasons connected with the construction of the movable plate.

Several movable plates may be used simultaneously with one stationary plate. For example, a second movable plate giving any number of designs, may be fitted, together with the 30-design movable plate previously described, for the purpose of giving various colors to the designs as they appear; or a second movable plate capable of producing a new set of thirty designs may be used with the original plate, twenty-nine of its designs appearing when the original plate stands at vacancy (or at clarity, if vacancy is produced by the closing of all the open spaces), while twenty-nine of the original plate's designs appear when the second plate stands at vacancy (or clarity). It is evident that, except for the difficulties introduced by the limitations of the materials used, such as the necessary thickness of the plates or the distances between the plates, any number of movable plates might be thus employed together.

In Figs. 3 and 4 a vertical (or horizontal) section of a pair of plates, 1 and 3, is shown, with a section of a third plate, 6, for varying the colors of the designs exhibited.

When it is necessary to protect the mechanism from the effects of the weather a sheet of glass 7 may be used for the front of the pair of plates. Convenient forms of a combined stationary plate and covering glass may be produced by means similar to those described for the manufacture of the movable plates. The covering glass may, of course, be colored as desired, in whole or in part.

In Figs. 3 and 4 I show an arrangement of a stationary plate 1 and two movable plates 3 and 6. The plates 3 and 6 are the same as those shown in Fig. 1 except for the arrangement of the areas in the stationary plate. The second movable plate 6 is shown as having its visual areas of colored glass for the purpose of changing the appearance of the designs formed by the positions of the other plates.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent is:

1. The combination of two superposed plates, each plate having visual areas so arranged that by the location of one plate in a predetermined relation to the other plate there will be produced an image, the two plates being relatively movable step by step to produce different images, the visual areas in one plate being in the form of separately disposed small areas equally spaced in parallel lines, the distance of separation between contiguous edges of adjacent areas being greater than the maximum extent of the movement of the two plates necessary to produce all the images in that direction, the other plate having visual areas substantially equal in size to the visual areas on the first plate, the dimensions of the visual areas in the direction of the step by step movement being smaller than the extent of one step of the step by step movement.

2. The combination of two superposed opaque plates, one plate having transparent areas so arranged that light will pass through them, the other plate having areas of visual effect substantially equal in size to the transparent areas of the first plate, the two plates being relatively movable step by step to produce different images by the coaction of the said transparent areas and the said areas of visual effect, the transparent areas on the one plate being in the form of separately disposed small areas equally spaced in parallel lines, the distance of separation between contiguous edges of adjacent areas being greater than the maximum extent of the movement of the two plates necessary to produce all of the images in those directions, the dimensions of the areas of visual effect and the areas of transparency in the direction of the step by step movement being smaller than the extent of one step of the step by step movement.

3. The combination of two superposed plates, each plate having visual areas so arranged that by the location of the one plate in a predetermined relation to the other plate there will be produced an image, the two plates being relatively movable step by step to produce different images, the visual areas in one plate being in the form of separately disposed small areas disposed in two sets of lines perpendicular to each other, each set of said lines being evenly spaced, the distance of separation between contiguous edges of adjacent areas being greater than the maximum extent of the movement of the two plates necessary to produce all the images in that direction, the other plate having visual areas substantially equal in size to the visual areas on the first plate, the dimensions of the visual areas in the direction of the step by step movement being smaller than the extent of one step of the step by step movement.

4. The combination of two superposed plates, one being an opaque plate with light transmitting areas and the other a marked plate with light transmitting areas and movable step by step, the marked plate having its light transmitting areas tinted in colors, the dimensions of the light transmitting areas of the marked plate, in the direction of the step by step movement, being smaller than the extent of one step of the step by step movement.

5. The combination of two superposed plates relatively movable step by step, one of said plates having equally spaced light transmitting areas, the other plate having light transmitting areas, the dimensions of such areas in the direction of the step by step movement being smaller than the extent of one step of the step by step movement.

6. The combination of two superposed plates, each plate having visual areas so arranged that by the location of the first plate in a predetermined relation to the other plate there will be produced an image, the two plates being relatively movable step by step to produce different images, the visual areas in one plate being in the form of separately disposed small areas arranged in two sets of lines perpendicular to each other, the areas in each line being staggered in relation to those in adjacent lines, the distance of separation between the contiguous sides of adjacent areas in each line being greater than the maximum extent of the movement of the two plates necessary to produce all the images in that direction, the other plate having visual areas substantially equal in size to the visual areas in the first plate, the dimensions of the visual areas in the direction of the step by step movement being smaller than the extent of a step in the step by step movement.

This specification signed and witnessed this ninth day of September, 1909.

WALTER LEO HILDBURGH.

Witnesses:
Hy Fairbrother,
Jno. Aldridge.

Copies of this patent may be obtained for five cents each, by addressing the "Commissioner of Patents, Washington, D. C."